United States Patent [19]
Strohmeier

[11] 3,734,472
[45] May 22, 1973

[54] SCREW EXTRUDER

[75] Inventor: Harald Strohmeier, 8605 Kapfenberg, Austria

[73] Assignee: Gebr. Bohler & Co. AG., Kapfenberg, Austria

[22] Filed: Feb. 3, 1971

[21] Appl. No.: 112,384

[30] Foreign Application Priority Data
Feb. 10, 1970 Austria................1174/70
Feb. 10, 1970 Austria................1172/70

[52] U.S. Cl.......................259/192, 259/6
[51] Int. Cl................................B01f 7/08
[58] Field of Search...............259/191, 192, 193, 259/6, 21, 40, 41, 185, 64; 425/204, 205, 208, 209, 113

[56] References Cited
UNITED STATES PATENTS

| 3,216,375 | 11/1965 | Ernst | 259/41 |
| 3,467,743 | 9/1969 | Otani | 425/205 |
| 3,563,514 | 2/1971 | Shattuck | 425/205 |

*Primary Examiner*—Robert W. Jenkins
*Attorney*—Holman & Stern

[57] ABSTRACT

The screw extruder serves to form a coating on welding electrodes and comprises a feed hopper, two feeder screws, which are disposed in the feed hopper and mesh with a backlash, a precompacting screw, which is disposed below the feed hopper, a first housing surrounding said precompacting screw, two high-pressure screws, which mesh substantially without backlash, and a second housing surrounding the two high-pressure screws. The feeder screws are operable to deliver coating composition to the precompacting screw and the latter is operable to deliver coating composition to the two high-pressure screws.

2 Claims, 3 Drawing Figures

SCREW EXTRUDER

BACKGROUND OF THE INVENTION

This invention relates to a screw extruder for forming the coatings of welding electrodes, including extruder screws arranged in three series-connected stages.

PRIOR ART

Apparatus are known in which the high pressures which are required to form the coatings of welding electrodes are produced in the coating compositions by means of pistons moving in cylinders. These apparatus are operated intermittently and for this reason may be used to coat welding wires only at relatively low rates.

To avoid that disadvantage, it has also been proposed to use screw extruders to form such coatings. The known screw extruders cannot subject the coating compositions to pressures which are sufficient to form satisfactory coatings on welding electrodes.

SUMMARY OF THE INVENTION

It is an object of the invention to avoid the above stated disadvantages and to provide a screw extruder which enables a trouble-free application of very high pressures of at least several hundred atmospheres to coating compositions for welding electrodes and a continuous forcing of the compositions into a die in which the desired coating is formed on the welding wire, which is supplied at high speed. In a screw extruder of the kind mentioned first hereinbefore, this is accomplished according to the invention in that two feeder screws are provided in a feed hopper and mesh with a backlash and are succeeded by a precompacting screw, which is disposed below the feed hopper and surrounded by a housing, and said precompacting screw is succeeded by two high-pressure screws, which mesh substantially without backlash and are enclosed by a common housing. This ensures that the very tough coating composition will be forced into the precompacting screw and will be conveyed by the same if the precompacting screw is disposed closely below the feed hopper and the axis of symmetry between the two feeder screws intersects in a known manner the longitudinal axis of the precompacting screw.

An embodiment of the screw extruder according to the invention is shown diagrammatically and by way of example in the drawing, in which

DETAILED DESCRIPTION OF THE INVENTION

Figure 1:
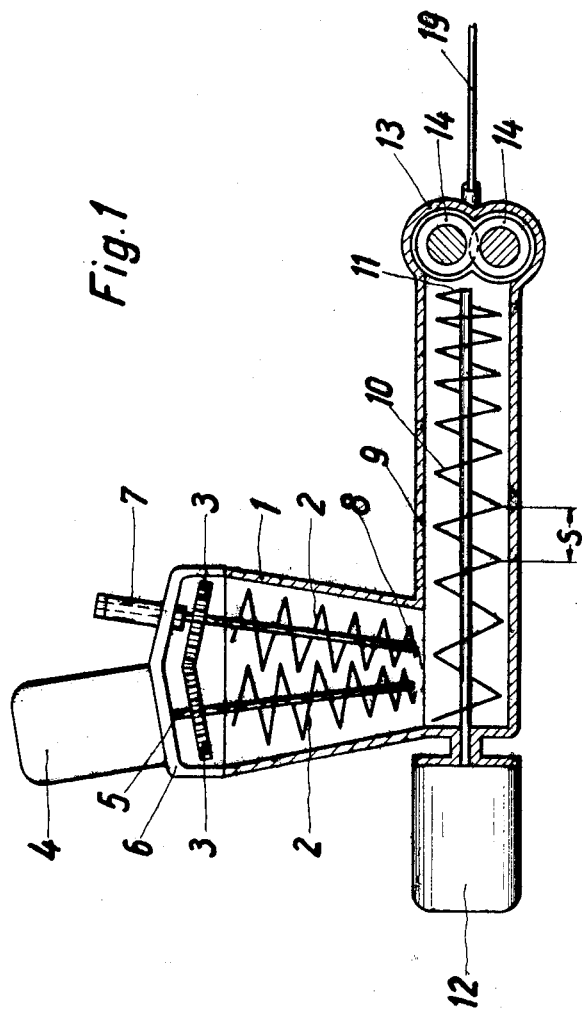
FIG. 1 is a vertical longitudinal sectional view showing a screw extruder for forming a coating on welding electrodes.
Figure 2:
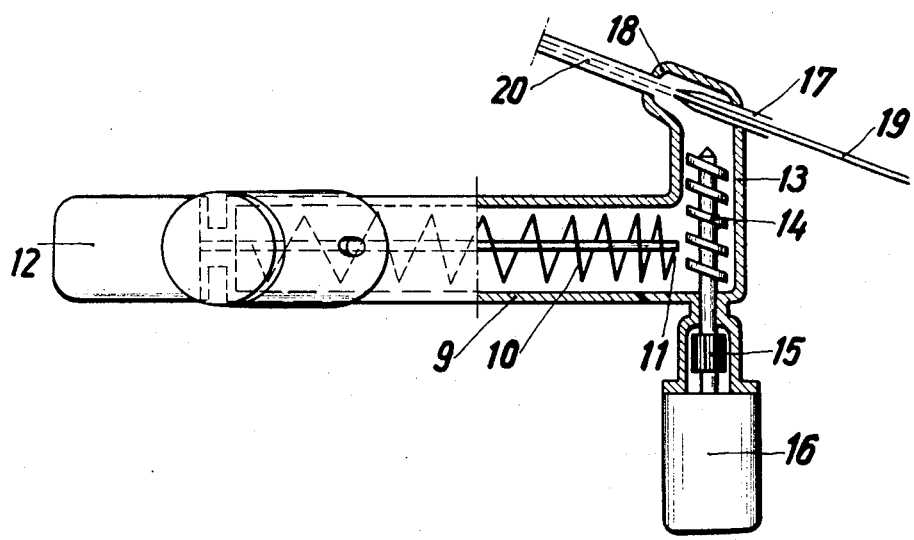
FIG. 2 is a partly sectional top plan view showing the same screw extruder and, FIG. 3 is a horizontal sectional fragmentary view showing on an enlarged scale the delivery end of said screw extruder viewed from above.
Figure 3:
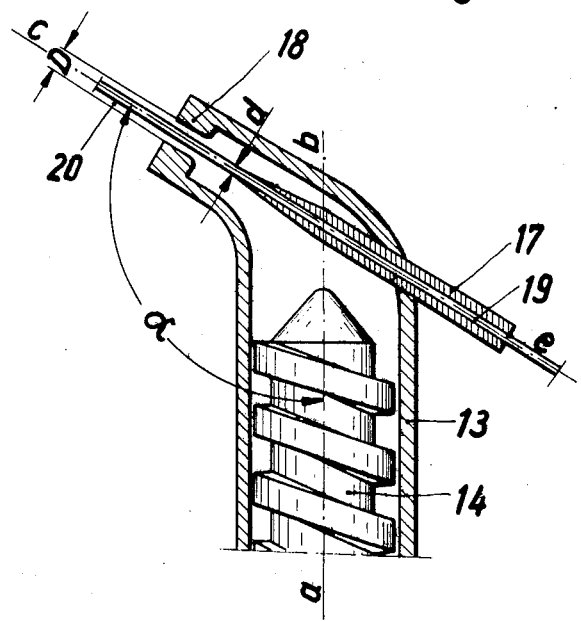

A downwardly tapering feed hopper 1 comprises two feeder screws 2, which mesh with a large backlash and are driven in mutually opposite directions and positively connected by two gears 3. One feeder screw 2 is directly coupled to a stub shaft 5 of an electric gearmotor 4, which is secured to a support 6 of the feed hopper 1. The other feeder screw 2 is rotatably mounted in a bearing 7, which is carried by the support 6. The feeder screws 2 receive the coating composition and force it through an opening 8 in the feed hopper 1 into a precompacting screw 10, which is disposed directly below the hopper 1 and driven by an electric gearmotor 12. The axis of symmetry disposed between the two feeder screws 2 intersects the longitudinal axis of the precompacting screw 10. The precompacting screw 10 is closely surrounded by a housing 9. The lead $s$ of the precompacting screw 10 and the channel cross-section of said screw decrease toward a delivery end 11 of the screw 10. As a result, the coating composition is fed under an increased pressure into two high-pressure screws 14, which are desirably mounted a small distance beside delivery end 11 of the precompacting screw 10. The precompacting screw and the housing surrounding it may have a conical taper toward the outlet end. The high-pressure screws 14 driven in mutually opposite directions mesh substantially without backlash and are closely surrounded by a common housing 13. They are also positively connected by two gears 15 and are driven by an electric gearmotor 16. An approximately funnel-shaped wire feeder 17 is provided beyond the delivery end of the high-pressure screws 14 between their geometrical longitudinal axes $a$–$b$ (FIG. 3) and extends into the housing 13. The geometric longitudinal axes $a$–$b$ of the high-pressure screws 14 and the geometric longitudinal axis $c$–$e$ of the wire feeder 17 include obtuse angles $\alpha$. The housing 13 carries a die 18, which is spaced from and concentric with the wire feeder 17 and has an inside diameter D, which is much larger than the outlet diameter of the wire feeder 17. A welding wire 19 is fed through the die 18 continuously and at a high speed and during this movement is centered by the wire feeder 17. The coating composition charged into the feed hopper 1 is fed by the feeder screws 2 disposed in the feed hopper 1 into the precompacting screw 10 and by the latter into the high-pressure screws 14. The coating composition which leaves the high-pressure screws 14 under very high pressure passes through the die 18 and emerges from the same into the open together with the welding wire 19. In this way, a desired coating 20 is formed on the welding wire 19.

Compared to the known apparatus mentioned above, the screw extruder according to the invention has the advantage of permitting the formation of satisfactory coatings on welding electrodes in a continuous operation and at very high speed.

What is claimed is:

1. A screw extruder for forming a coating on welding electrodes, said screw extruder comprising
   a feed hopper,
   two feeder screws, which are disposed in the feed hopper and mesh with a backlash,
   a precompacting screw, which is disposed below the feed hopper,
   a first housing surrounding said precompacting screw,
   two high-pressure screws, which mesh substantially without backlash, and
   a second housing surrounding said two high-pressure screws,
   said feeder screws being operable to deliver coating composition to said precompacting screw and the latter being operable to delivery coating composition to said two high-pressure screws.

2. The screw extruder as set forth in claim 1, in which said precompacting screw is disposed closely below said feed hopper,
   said two feeder screws have a common axis of symmetry, and
   said precompacting screw has a longitudinal axis which intersects said axis of symmetry.

* * * * *